US 6,675,743 B1

(12) United States Patent
Jeffrey et al.

(10) Patent No.: US 6,675,743 B1
(45) Date of Patent: Jan. 13, 2004

(54) MASSAGE BLANKET FOR PETS

(75) Inventors: Martin D. Jeffrey, Roanoke, VA (US); Sharron D. Jeffrey, Roanoke, VA (US)

(73) Assignee: Two Olive Trees Ministries, Roanoke, VA (US)

( * ) Notice: Subject to any disclaimer, the term of this patent is extended or adjusted under 35 U.S.C. 154(b) by 0 days.

(21) Appl. No.: 10/350,118

(22) Filed: Jan. 24, 2003

(51) Int. Cl.$^7$ .............................. A01K 13/00; B68C 5/00
(52) U.S. Cl. .............................. 119/850; 601/79; 2/905
(58) Field of Search .......................... 119/850; 54/79.1, 54/79.2, 79.4; 2/905; 601/79

(56) References Cited

U.S. PATENT DOCUMENTS

| 718,896 | A | * | 1/1903 | Ames et al. ............... 607/112 |
| 4,005,703 | A | | 2/1977 | Rosen et al. ................ 128/33 |
| 4,199,264 | A | | 4/1980 | Uebel ........................ 366/123 |
| 5,127,213 | A | * | 7/1992 | Petronio ....................... 54/71 |
| 5,426,925 | A | * | 6/1995 | Smargiassi ................. 54/79.1 |
| 5,865,771 | A | | 2/1999 | Shuto et al. ................. 601/47 |
| 6,142,963 | A | | 11/2000 | Black et al. ................. 601/57 |
| 6,170,602 | B1 | * | 1/2001 | Mann ......................... 181/141 |
| 6,193,678 | B1 | * | 2/2001 | Brannon ...................... 601/15 |
| 6,326,711 | B1 | | 12/2001 | Yamaguchi et al. .......... 310/81 |
| 6,454,735 | B1 | * | 9/2002 | Hamada ...................... 602/61 |

FOREIGN PATENT DOCUMENTS

| DE | 4 140 507 A1 | 4/1993 |
| FR | 2 731 145 A3 | 9/1996 |

* cited by examiner

Primary Examiner—Robert P. Swiatek
Assistant Examiner—Bethany L Griles
(74) Attorney, Agent, or Firm—Litman Law Offices, LTD; Richard C. Litman; Warren Edmonds

(57) ABSTRACT

A vibrator blanket for use with pets has a battery pouch having a battery pack located on the back of the animal, such as a dog, for energizing a plurality of small vibrators distributed within the blanket, for imparting vibration to various locations on the pet. The blanket has layers between which the vibrators and electrical wiring are installed, to keep the pet from damaging the vibrator system. A switch is used to select different levels of vibration. The blanket may be split at the belly and have buckles or Velcro to secure the blanket. The under-blanket is preferably at least one layer of insulated fabric upon which up to 50 vibrator motors are mounted per side of the animal below the backbone. Separate battery packs having external control switches for selecting levels of vibration are installed so as to be on each side of the back of the animal.

20 Claims, 4 Drawing Sheets

MASSAGE BLANKET FOR PETS

BACKGROUND OF THE INVENTION

1. Field of the Invention

The present invention relates to therapeutic devices. More particularly, the present invention relates to vibrator massage blankets for wear by a pet.

2. Description of the Related Art

Blankets for mounting on pets such as dogs or cats are widely used. They provide warmth, protection, and a feeling of security, however they provide no stimulus to the animal. Most pets, particularly dogs, enjoy massaging by their owner or other person. Such a person may not be available when massage or rubbing is desired by the dog. It would be desirable to provide such a blanket that provides for massage to a pet as well as the traditional functions of a blanket. It would further be desirable that the massage blanket is self-contained so the pet is not confined to particular locations for receiving power for the vibrators.

German Patent (DE 4 140 507) to Erich, published in April 1993, describes an electrically heated horse blanket with a strap for securing the blanket around the body of the horse. Heating elements are supplied with current from a battery fitted into a battery pocket of the blanket.

U.S. Pat. No. 6,142,963, issued Nov. 7, 2000, to Black et al., describes a vibrating blanket with a mechanism for adjusting the vibration frequency and intensity.

U.S. Pat. No. 5,865,771, issued Feb. 2, 1999, to Shuto et a l., describes an incubator mat having a vibrator within the mat.

U.S. Pat. No. 4,005,703, issued Feb. 1, 1977, to Rosen et al., describes vibratory therapeutic elements disposed within a blanket-like article.

French Pat. (FR 2 731 145) to Max, published in September 1996, describes a therapeutic blanket with Velcro or hook and loop fasteners.

U.S. Pat. No. 6,326,711, issued Dec. 4, 2001, to Yamaguchi et al., and U.S. Pat. No. 4,199,264, issued Apr. 22, 1980, to Uebel, each describe cylindrically configured, unbalanced rotor type vibrator motors.

None of the above inventions and patents, taken either singularly or in combination, is seen to describe the instant invention as claimed. Thus a massage blanket for pets solving the aforementioned problems is desired.

SUMMARY OF THE INVENTION

The present invention is a vibrator blanket for use with pets. The vibrator blanket has a pouch containing a battery pack located on the back of the animal, such as a dog, for energizing a plurality of small vibrators distributed within the blanket for imparting vibration to various locations on the pet. The blanket has an inner and outer layer between which the vibrators and electrical wiring are installed so as to keep the pet from damaging the vibrator system. The battery pack may contain conventional or rechargeable batteries. A switch is incorporated within the system to select different levels of vibration as desired. The blanket may also be split at the belly and incorporate straps having buckles or Velcro hook and loop material for securing the blanket on the animal. The under-blanket is preferably at least one layer of insulated fabric upon which up to 25 vibrator motors are mounted thereon per side of the animal below the backbone. Separate battery packs having external control switches for selecting level of vibration are installed so as to be on each side of the back of the animal. Alternatively, the battery packs may be wired together and the system operated by a single switch mounted on one of the battery packs. The vibrator motors are preferably cylindrical in shape, being of the unbalanced rotor type and held in individual rubber boots having mounts, which may be connected with the insulated fabric. The mounted motors and electrical wiring are covered by another layer of lightweight material such as synthetic rubber that is both heat and fire resistant. The battery power packs are preferably made with synthetic material covering having a heat and fire resistant internal lining.

Accordingly, it is a principal object of the invention to provide a blanket that may be secured on the body of a pet such as a dog that has a therapeutic effect.

It is another object of the invention to provide a blanket as above which incorporates a vibrator system for massaging the pet.

It is a further object of the invention to provide a massage blanket as above which is self-contained.

Still another object of the invention is to provide a massage blanket as above which is battery operated and provides a battery pouch containing a battery pack that may include standard or rechargeable batteries Yet another object of the invention is to provide a massage blanket as above which provides a switch for actuating and selecting a desired level of vibration.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a vibrator blanket for use with pets. The vibrator blanket has a battery pouch containing a battery pack located on the back of the animal, such as a dog, for energizing a plurality of small vibrators distributed within the blanket for imparting vibration to various locations on the pet. The blanket has an inner and outer layer between which the vibrators and electrical wiring are installed so as to keep the pet from damaging the vibrator system. The battery pack may contain conventional or rechargeable batteries. A switch is incorporated within the system to select different levels of vibration as desired. The blanket may also be split at the belly and incorporate straps having buckles or Velcro hook and loop material for securing the blanket on the animal.

Figure 1:
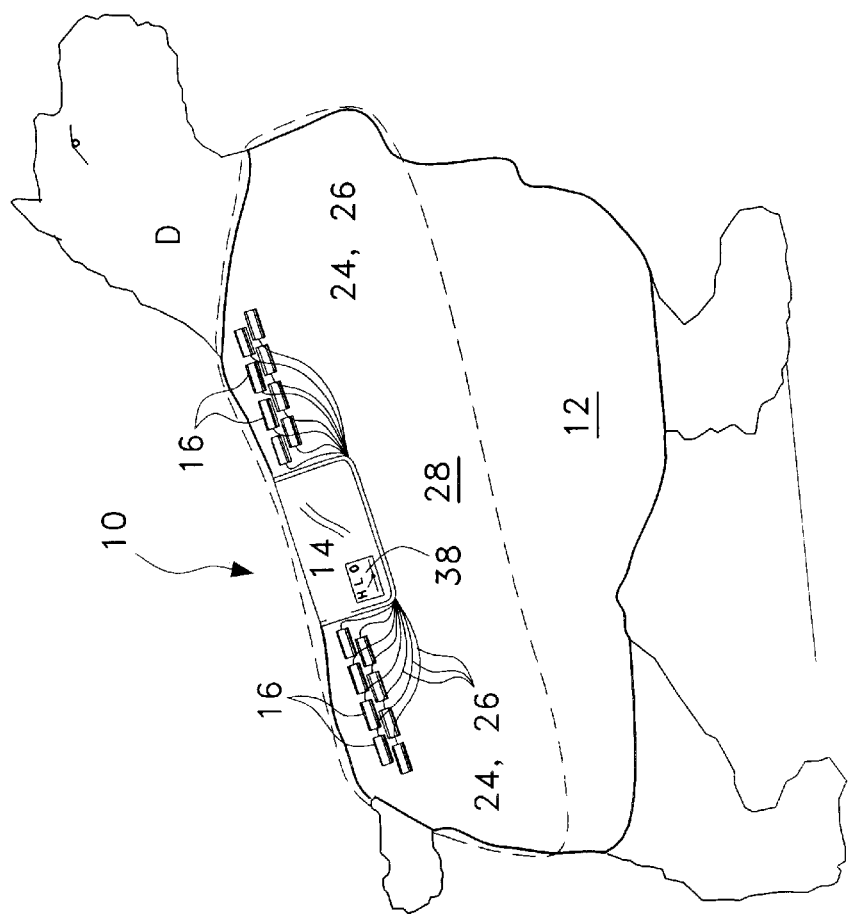
FIG. 1 is an environmental, side elevation view of a massage blanket for pets according to the present invention.

Referring to FIG. 1, there is shown an environmental, side elevation view of the inventive pet and animal massage blanket generally referred to by the numeral 10. Massage blanket 10 includes an under-blanket 12 worn by the pet such as dog D. A battery power pouch 14 is located to the side of the central portion of the pet's back for encasing a battery pack (not shown) of conventional design. The massage blanket includes a self-contained vibrator system for providing massaging action to the pet. The vibrator system includes forward and rear groups of electrically operated vibrators 16 which are electrically connected to the battery pack in pouch 14 by positive and negative electrical leads 24 and 26, respectively to provide battery power for operation of the respective vibrators 16. The vibrators are physically attached to the outer surface of the under-blanket 12, the inner surface providing protection to the pet's body. An over-blanket 28 (shown in phantom lines) is fitted over the vibrator system components to avoid damage by the pet and is securely attached to the under-blanket by sewing or other convenient means. A three-position switch 38 is mounted on the battery pouch 14 for controlling the operation of the vibrator system between an off position O, a low position L, and a high position H. The blanket may be of the slip-on type as shown or be split at the belly with connecting straps (See FIG. 4).

Figure 2:
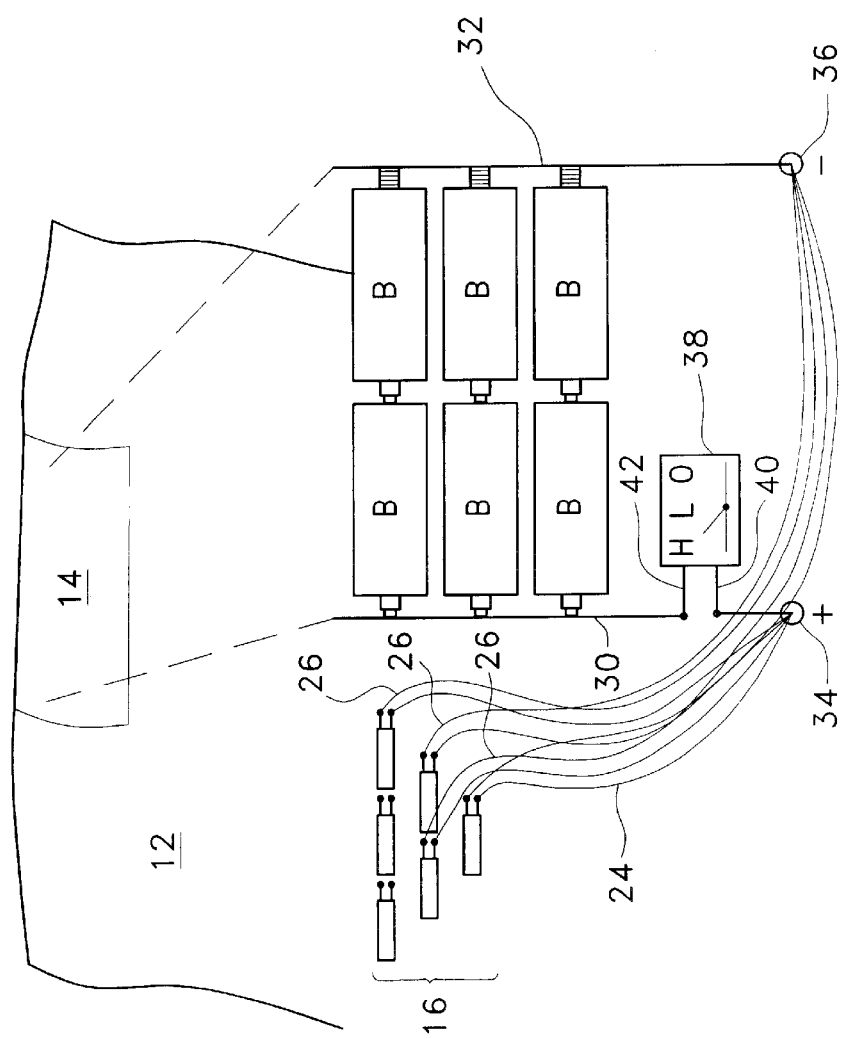
FIG. 2 is a detail electrical diagram of the battery pack, vibrators and associated electrical elements of the pet blanket of FIG. 1.

Referring to FIG. 2, there is shown a detail representative portion of a wiring diagram of the vibrator system including vibrators 16 located on under-blanket 12. In the battery pack, batteries B are connected between positive bus 30 and negative bus 32. Positive bus 30 is connected to power positive contact 34 by means of bus switch lead 42, 3-position switch 38, and power positive contact lead 40. Negative bus 32 is connected to power negative contact 36. Individual negative leads 26 are connected between power negative contact 36 and individual vibrator leads 18 (See FIG. 3A). Similarly, individual positive leads 24 are connected between power positive contact 34 and individual vibrator leads 18. The leads 24 and 26 are preferably electrically insulated. The vibrators 16 may be actuated by turning switch 38 from the off position "O" to the low position "L" or the high position "H" to provide a low level or high level vibration massage as desired for a particular animal. The details of the electrical wiring may be varied and such are regarded as within the scope of the invention.

Figure 3B:
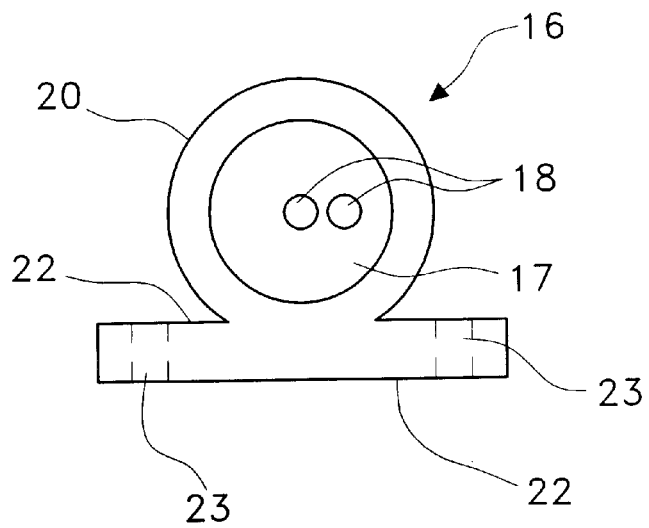
FIG. 3B is an end view of the vibrator and attachment boot of FIG. 3A.
Figure 3A:
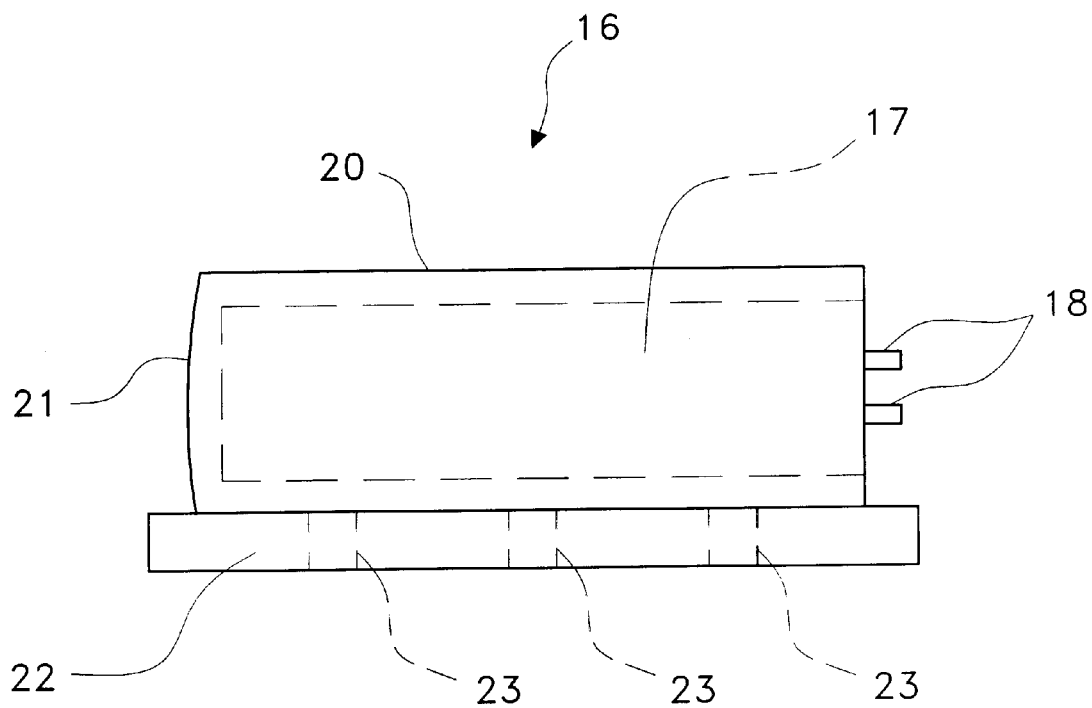
FIG. 3A is a side elevation view of a vibrator and attachment boot of FIG. 1.

Referring to FIGS. 3A and 3B, there are shown a side elevation view and an end view, respectively, of the vibrator 16. Vibrator 16 includes a generally cylindrical vibrator motor 17 having an unbalanced rotor of generally known design. The motor has electrical connections 18 to connect with a pair of wire leads 24, 25, respectively, for providing power to drive the motor 17, the turning unbalanced rotor inducing vibration in the unit in a known manner. The vibrator motor 17 is fit into a cylindrical sleeve-like boot 20 preferably made of synthetic rubber or similar material and having an open end for receiving the motor 17 and an opposite closed end wall 21. The boot 20 is dimensioned so as to removably secure the motor by friction between respective outer and inner walls. Boot 20 has a lengthwise mount 22 extending along its outer wall to serve as a base for attaching the vibrator 16 to under-side blanket 12. Mount 22 has mounting holes bored 23 extending therealong on each side of the cylindrical boot 20 for attachment by sewing, rivets, or other fasteners.

Figure 4:
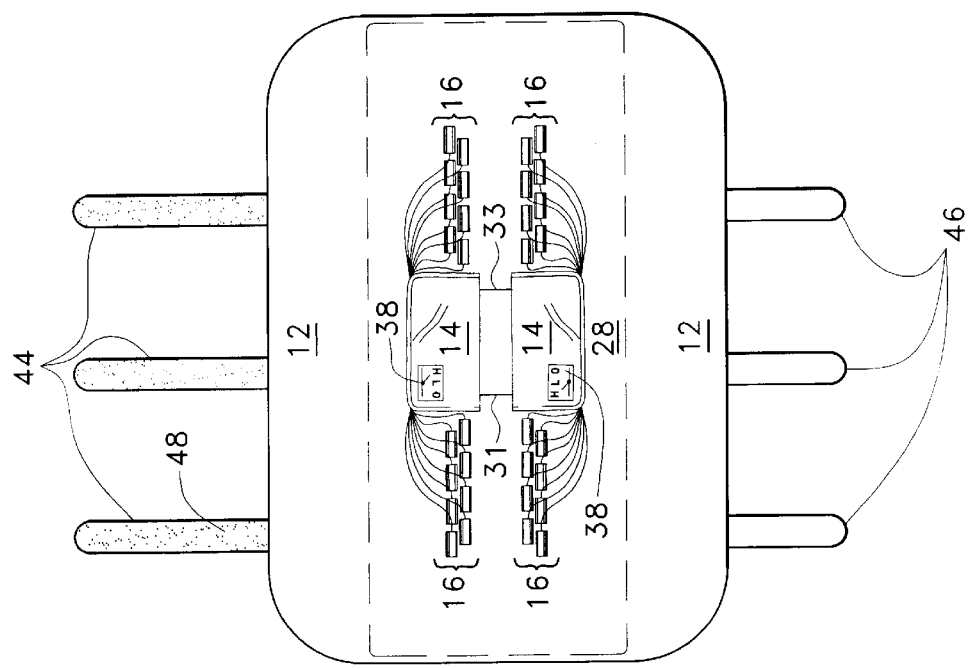
FIG. 4 is a plan view of the massage blanket of FIG. 1 as laid flat and having attachment belts for fastening the blanket around the belly of a pet.

Referring to FIG. 4, there is shown a plan view of the pet massage blanket removed from the animal. As is seen, under-blanket 12 has identical vibrator systems to be worn on each side of the pet such as dog D and placed so as to drape on opposite sides of the backbone of the animal, the vibrators 16 being driven by battery packs in respective pouches 14 and controlled by switches 38. The battery packs within pouches 14 may be connected by electrical leads 31 and 33, and connected in a known manner to allow operation of both vibrator systems with a single switch 38. Both vibrator systems are covered by over-blanket 28. The over-blanket 28 may be of the same dimensions as the under-blanket 12 as desired. The massage blanket is fastened at the belly of the dog D or other animal by means of long straps 44 and short straps 46 which adjustably fasten together by means of hook and loop material (Velcro) 48 or by other means such as buckles or snaps (not shown). As illustrated, the mating hook and loop material is not shown on short straps 46 as they would not be visible in the plan view, but are located on the under side thereof in a known manner.

The vibrator motors are small in size and operate, for example, on 1.5–3 VADC @62 mA. Each motor has an unbalanced shaft or rotor, causing vibration upon rotor rotation. The motor is preferably cylindrical in shape and has, for example, a 0.24-inch diameter and a one-half inch length. The motor rotor shaft and weight for unbalance add 0.21 inches to the overall motor length. A black rubber cylindrical boot surrounds the motor and provides a flat mounting surface for mounting surface for attachment to the outer surface of the under-side blanket. The underside blanket has a layer of insulated fabric upon which up to fifty of the vibrator motors per battery pouch are embedded and overlaid with the over-blanket. The over-blanket is a layer of lightweight rubber or similar material that is heat and fire resistant.

The battery power pack includes 6 size "C" DC batteries. The battery pouch is preferably made of synthetic leather material with heat and fire resistant internal lining. The switch is a standard switch having and off and two different speed positions. The switch is attached to the outer side of the battery power pouch. The inventive blanket may be made to fit much like a jacket for pets with small straps for attachment at the pet belly. The inventive massage blanket may be provided in sizes appropriate for dogs, cats, horses, potbelly pigs, and other four-legged pets and animals. The battery back may be of the rechargeable type.

The inventive massage blanket is portable and self-contained, and may be rechargeable. A single size product may easily be re-sizeable to fit small, medium, and large dogs or other pets, and is easily installed and removed for use on other pets.

It is to be understood that the present invention is not limited to the embodiments described above, but encompasses any and all embodiments within the scope of the following claims.

We claim:
1. A massage blanket for pets comprising:
   an under-blanket having an inner and an outer side;
   a vibrator system located on said outer side comprising:
      at least one battery power pouch;
      at least one battery located within said power pouch;
      at least one electrically powered vibrator attached to said outer side of said under-blanket;
      said at least one vibrator having lead wires electrically connected with said at least one battery so as to operate said at least one vibrator;

means to electrically activate said at least one vibrator; and an over-blanket located on said outer side and attached to said under-blanket;

said over-blanket being of such size as to at least cover said at least one vibrator and said lead wires;

said over-blanket being attached to said outer side of said under-blanket at a location so as to a cover said at vibrators and lead wires;

said under-blanket being of such size and configuration as to be securely mounted on the trunk of a pet or other animal;

whereby, upon mounting said massage blanket on the pet or other animal and activation of said at least one vibrator, the pet or animal is subjected to vibration massage.

2. The massage blanket for pets of claim 1, wherein said vibrator system comprises a plurality of vibrators having a corresponding number of positive and negative lead wires electrically connected with said at least one battery.

3. The massage blanket for pets of claim 2, wherein said plurality of vibrators are located in a plurality of groups such that said at least one group is located on each side of said pet or animal when worn by the animal.

4. The massage blanket for pets of claim 3, wherein there are forward and rearward vibrator groups located on each side of the pet or animal when worn.

5. The massage blanket for pets of claim 4, wherein said at least one battery pouch is centrally located along the back of the pet or animal when worn.

6. The massage blanket for pets of claim 5, wherein said means for activating said vibrators is a three-way switch having an off position, a low position, and a high position and electrically connected with said at least one battery so as to allow said vibrators to be activated, operated at a low level of vibration, and operated at a high level of vibration, respectively.

7. The massage blanket for pets of claim 6, wherein said three-way switch is located on one of said pouches such the it may be operated by the pet or animal handler.

8. The massage blanket for pets of claim 5, wherein there are two battery pouches located on opposite sides of the backbone of the pet or animal when worn, each battery pouch having at least one battery.

9. The massage blanket for pets of claim 8, wherein said forward and rear vibrator groups are electrically connected to an intervening battery pouch located on the corresponding side of said pet or animal when worn.

10. The massage blanket for pets of claim 9, wherein said means for activating said vibrators is a switch and said battery pouches are electrically interconnected so as to allow activation by a single switch.

11. The massage blanket for pets of claim 5, wherein said vibrator system further comprises a battery pack having a plurality of batteries, a positive bus having a positive contact and a negative bus having a negative contact, said batteries being connected between said positive bus and said negative bus, said positive electrical leads being connected to said positive contact and said negative electrical leads being connected to said negative lead.

12. The massage blanket for pets of claim 11, wherein said means for activating said vibrators is a switch electrically connected between said positive bus and said positive contact.

13. The massage blanket for pets of claim 11, wherein said battery pack is rechargeable.

14. The massage blanket for pets of claim 1, wherein each said vibrators comprises a generally cylindrical, unbalanced rotor, electric vibrator motor.

15. The massage blanket for pets of claim 14, each said vibrator further comprising a mounting boot having a cylindrically shaped wall so configured as to conform to and receive said vibrator motor.

16. The massage blanket for pets of claim 15, said cylindrically shaped mounting boot having an open end for insertion of said vibrator motor, an opposed end wall, and a generally planar mount located lengthwise and integral with the cylindrical wall.

17. The massage blanket for pets of claim 16, wherein said planar mount has mounting bores extending therealong for mounting to the outer surface of said under-blanket by sewing, rivets, or similar means.

18. The massage blanket for pets of claim 1, further wherein said under-blanket has attached, adjustable straps for securing said blanket around the belly of the animal or pet.

19. The massage blanket for pets of claim 18, wherein said adjustable straps have hook and loop material located on said straps for adjustably and removably securing said straps together for securing said massage blanket to said pet.

20. The massage blanket for pets of claim 19, wherein said adjustable straps are a corresponding plurality of two lengths, one length being located and spaced along one edge of said blanket and another length being located and spaced along the opposing edge of said blanket as worn by the pet.

* * * * *